US007543077B1

(12) United States Patent
Milliken et al.

(10) Patent No.: US 7,543,077 B1
(45) Date of Patent: Jun. 2, 2009

(54) TERNARY CONTENT ADDRESSABLE MEMORY EMBEDDED IN A CENTRAL PROCESSING UNIT

(75) Inventors: Walter Clark Milliken, Dover, NH (US); Craig Partridge, East Lansing, MI (US); Alden W. Jackson, Jamaica Plain, MA (US)

(73) Assignee: Stragent, LLC, Longview, TX (US)

( * ) Notice: Subject to any disclaimer, the term of this patent is extended or adjusted under 35 U.S.C. 154(b) by 1742 days.

(21) Appl. No.: 09/938,921

(22) Filed: Aug. 24, 2001

Related U.S. Application Data

(60) Provisional application No. 60/233,583, filed on Sep. 19, 2000.

(51) Int. Cl.
*G06F 15/167* (2006.01)
*G06F 15/173* (2006.01)

(52) U.S. Cl. ................ 709/245; 709/215; 709/224; 709/238

(58) Field of Classification Search .......... 709/215, 709/223, 224, 238, 245, 247; 365/49; 711/138; 714/733
See application file for complete search history.

(56) References Cited

U.S. PATENT DOCUMENTS

| | | | | |
|---|---|---|---|---|
| 5,519,649 A | * | 5/1996 | Takahashi | ............... 708/525 |
| 5,638,315 A | * | 6/1997 | Braceras et al. | ............... 365/49 |
| 5,809,078 A | | 9/1998 | Tani et al. | |
| 6,000,016 A | * | 12/1999 | Curtis et al. | ............... 711/138 |
| 6,076,137 A | | 6/2000 | Asnaashari | |
| 6,141,743 A | * | 10/2000 | Strongin | ............... 709/247 |
| 6,147,890 A | * | 11/2000 | Kawana et al. | ............... 365/49 |
| 6,304,903 B1 | * | 10/2001 | Ward | ............... 709/224 |
| 6,324,087 B1 | * | 11/2001 | Pereira | ............... 365/49 |
| 6,327,639 B1 | | 12/2001 | Asnaashari | |
| 6,510,509 B1 | * | 1/2003 | Chopra et al. | ............... 709/238 |
| 6,560,740 B1 | * | 5/2003 | Zuraski et al. | ............... 714/733 |
| 6,647,428 B1 | * | 11/2003 | Bannai et al. | ............... 709/245 |
| 6,651,096 B1 | * | 11/2003 | Gai et al. | ............... 709/223 |
| 6,658,458 B1 | * | 12/2003 | Gai et al. | ............... 709/215 |
| 6,725,351 B1 | | 4/2004 | Shimizu | |
| 6,757,779 B1 | * | 6/2004 | Nataraj et al. | ............... 709/238 |
| 6,792,502 B1 | * | 9/2004 | Pandya et al. | ............... 709/236 |
| 2004/0193741 A1 | * | 9/2004 | Pereira et al. | ............... 710/1 |

OTHER PUBLICATIONS

J. Robert Lineback, "Virage announces first embedded content-addressable memory for routers, switches", Jun. 19, 2000, pp. 1-2.*
Devavrat Shah et al., Fast Updates on Ternary-CAMs for Packet Lookups and Classification, Proc. Hot Interconnects VIII, Aug. 2000, Stanford, PS PDF Slides in PPT. Also in IEEE Micro, vol. 21, No. 1, Jan./Feb. 2001 (9 Pages).

* cited by examiner

*Primary Examiner*—Quang N. Nguyen

(57) ABSTRACT

An arithmetic logic unit (140) improves the processing of information. The arithmetic logic unit (140) includes a register unit (250), a ternary content addressable memory (260), and an operations unit (270).

16 Claims, 5 Drawing Sheets

TERNARY CONTENT ADDRESSABLE MEMORY EMBEDDED IN A CENTRAL PROCESSING UNIT

RELATED APPLICATION

This application claims priority under 35 U.S.C. §119 based on U.S. Provisional Application No. 60/233,583, filed Sep. 19, 2000, the disclosure of which is hereby incorporated by reference.

FIELD OF THE INVENTION

The present invention relates generally to central processing units and, more particularly, to systems and methods for processing data via a central processing unit containing an embedded ternary content addressable memory device.

BACKGROUND OF THE INVENTION

Data networks are becoming more critical to every aspect of the business world. No longer are all divisions of a company, such as marketing, R&D, production, and sales co-located within the same building or campus. In many cases, the personnel supporting these business units are not even located within the same country or continent. Virtual worldwide corporate networks typically consist of local area networks (LANs), which are often connected to the Internet to reach employees across the globe. As businesses increase their use of networks, the result will be a more heavy reliance on transmitting data across these networks. This need for greater bandwidth and faster processing power will ultimately drive the need for more specialized network components.

At the heart of this technology race is the central processing unit (CPU). The CPU, or the brains of most network devices, has evolved over time to fit a greater number of transistors into ever smaller packages. The basic goal of every new CPU design is to perform more operations in less time. As a result, new CPU architecture designs are needed to support an increasing and massive flow of information across networks at all levels.

The network protocols that are becoming the standard for moving this massive amount of information require specific operations to be performed. The CPUs used in this infrastructure must contain specialized functions to permit the rapid classification, manipulation, routing, and processing of packet-based messages. Performing fast parallel search operations would be useful in performing lookups in routers and networking equipment, in performing network traffic address management, and for performing other functions in which pattern recognition is needed. In addition, on-chip error detection circuitry is needed to determine if data packets reached their destination without error, and to aid in the retransmission of those data packets that did not. Currently, on-chip CPU designs are not specialized to perform the network intensive functions necessary to achieve the next level in network processing.

Accordingly, there is a need for systems and methods that will address CPU architecture designs that embed the important network processing functions into the CPU, and thereby eliminate the need to go off-chip to perform these functions.

SUMMARY OF THE INVENTION

Systems and methods consistent with the present invention address this and other needs by providing a unique CPU architecture that permits faster processing of network data packets through the incorporation of a ternary (three operating-state) content addressable memory (CAM).

In accordance with the purpose of this invention as embodied and broadly described herein, a CPU is provided that includes an arithmetic logic unit (ALU) and a ternary CAM. The ternary CAM is configured to perform one or more matching operations.

In another implementation consistent with the present invention, a method for processing packets in a network device is provided. The method includes receiving a packet and processing the packet using a ternary content addressable memory resident within a processing unit of the network device.

In yet another implementation consistent with the present invention, an ALU is provided. The ALU includes a register unit, a ternary content addressable memory, and an operations unit.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention provide a process through which a data packet may be processed by a CPU specialized to perform network processing operations. The CPU consists of a bus, a memory unit, a control unit, and an enhanced arithmetic logic unit (ALU). The ALU contains a ternary CAM unit to permit improved processing performance.

Exemplary System Configuration

Figure 1:
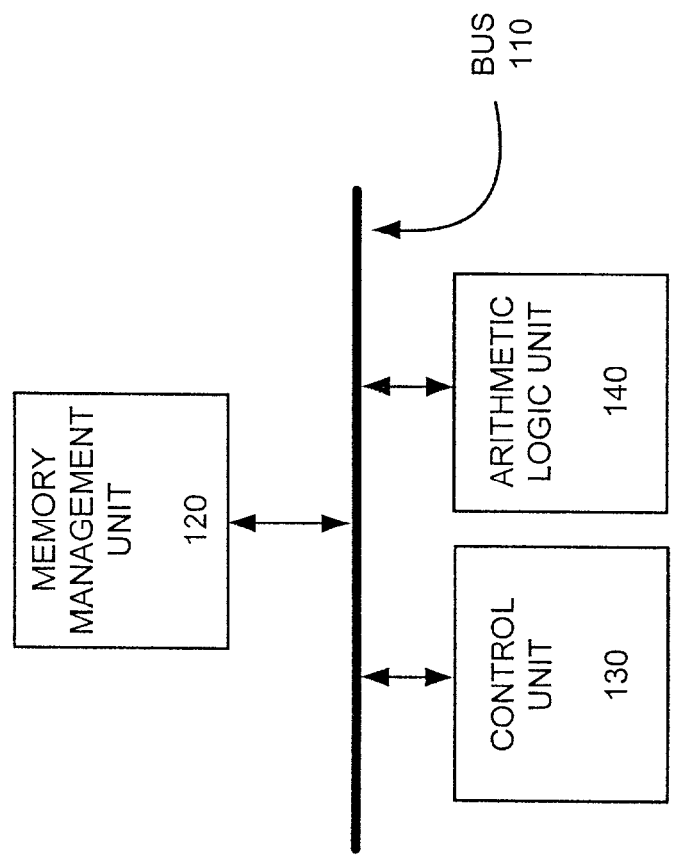
FIG. 1 illustrates an exemplary CPU in which systems and methods consistent with the present invention may be implemented.

FIG. 1 illustrates an exemplary CPU 100 in which systems and methods, consistent with the present invention for processing network data packets may be implemented. The CPU 100 includes a bus 110, a memory management unit 120, a control unit 130, and an ALU 140. A single memory management unit 120, control unit 130, and ALU 140 have been shown for simplicity. It will be appreciated that the techniques described herein are equally applicable to CPUs 100 having multiple memory management units 120, control units 130, and/or ALUs 140. The bus 110 may contain one or more conventional buses or single signal lines that permit communication among the components of the CPU 100, and between the CPU 100 and external devices.

The memory management unit 120 may contain the high-speed registers or storage devices used by the CPU 100 for temporary storage of instructions, addresses, and/or data. The memory management unit 120 may also contain circuitry to translate internal logical addresses into external physical addresses for broadcast to devices external to the CPU 100.

The control unit 130 may consist of the circuitry necessary to manage the operation of the CPU 100, and communicate with the memory management unit 120 and the ALU 140 in a well-known manner. The control unit 130 may regulate and integrate the operations of the CPU 100 by selecting and retrieving instructions from a main memory in the proper sequences, and interpreting those instructions so as to activate the other functional elements of the CPU 100 at the appropriate times to perform their respective operations. The control unit 130 may transfer input data to the ALU 140 for processing.

The ALU 140 may function as the center core of the CPU 100 at which all calculations and comparisons are performed. The ALU 140 may execute arithmetic and logical operations, CRC operations, pattern-matching operations, and some shift and extract operations on data received via two input buses. The ALU 140 may contain various components to perform the operations described above.

Exemplary Arithmetic Logic Unit

Figure 2:
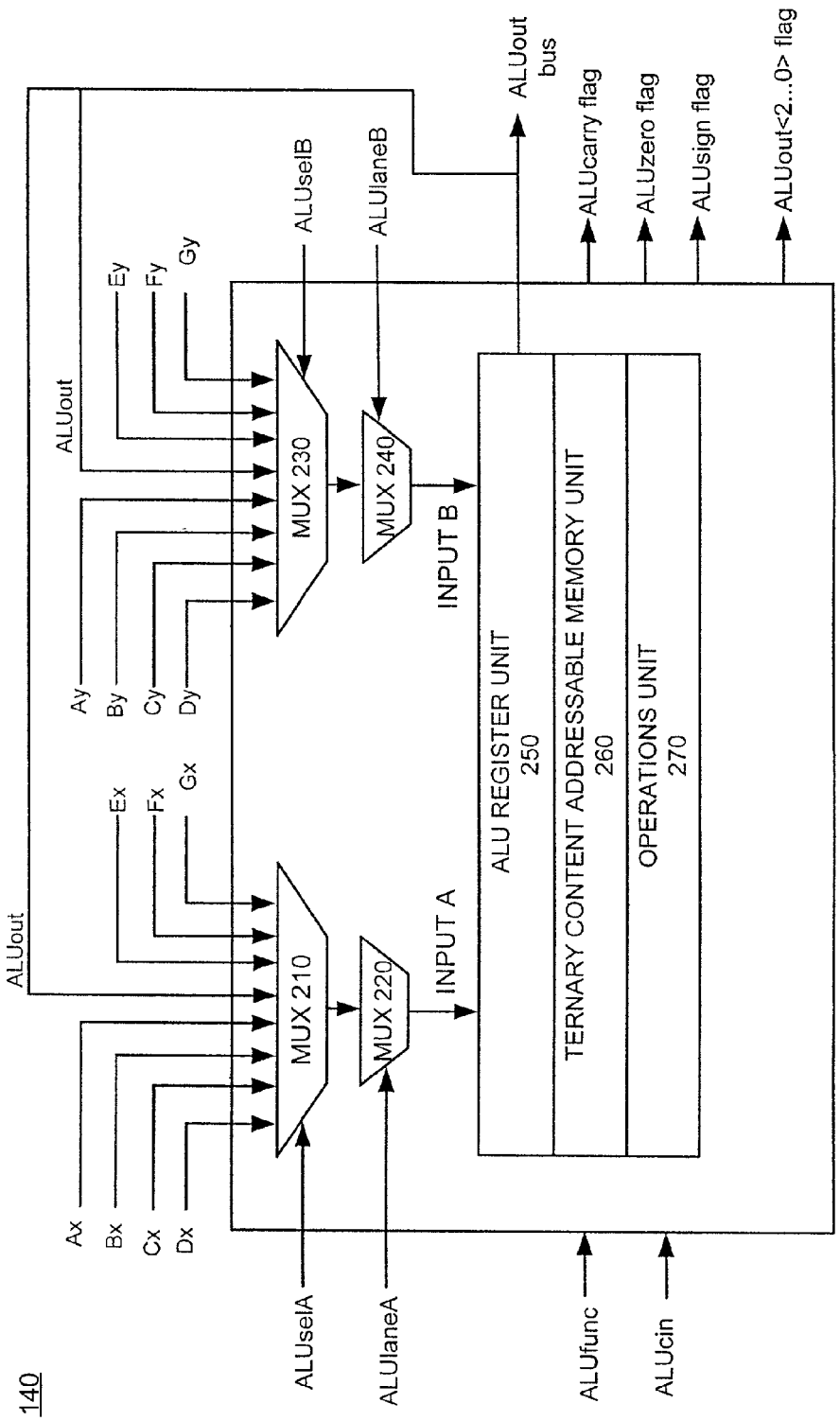
FIG. 2 illustrates an exemplary configuration, consistent with the present invention, of the ALU of FIG. 1.

FIG. 2 illustrates an exemplary configuration of the ALU 140 of FIG. 1. In FIG. 2, the ALU 140 includes a multiplexer (MUX) 210, a MUX 220, a MUX 230, a MUX 240, an ALU register unit 250, a ternary CAM unit 260, and an operations unit 270. A single MUX 210, MUX 220, MUX 230, MUX 240, ALU register unit 250, ternary CAM unit 260, and operations unit 270 have been shown for simplicity. It will be appreciated that the techniques described herein are equally applicable to ALUs 140 having multiple components as described above. The input signals and connections between functional blocks may be represented as buses, single signal lines, optical connections, or by any other information carrying architecture.

The ALU 140 may include control inputs to facilitate proper data selection, identify the operation to be performed, and supplement arithmetic operations. The ALUselA input may cause the MUX 210 to output a subset of the received signals. The ALUlaneA input may cause the MUX 220 to output a subset of the received signals. Similarly, the ALUselB input may cause the MUX 230 to output a subset of the received signals and the ALUlaneB input may cause the MUX 240 to output a subset of the received signals. The ALUselA and ALUselB inputs may, for example, each consist of 3 bits of information. The ALUlaneA input and ALUlaneB input may provide the 32-bit word for INPUT A and INPUT B to use as the A or B operand, respectively. The ALUlaneA and ALUlaneB inputs may, for example, each consist of 2 bits of information. The ALUfunc input may provide the operation to be performed on the operand(s), and may consist of 5 bits of data input information. The ALUcin input may provide information regarding whether a carry-in is present for arithmetic operations, and may be able to provide this information with 1 bit of information. While each of the control inputs (i.e., ALUselA, ALUselB, ALUlaneA, ALUlaneB, ALUfunc, and ALUcin) has been specified as a signal or bus consisting of a specific number of bits, the present invention does not limit each control input to any specific size.

The ALU 140 may include data output signals to provide resultants and information flags to other devices and/or systems. The 32-bit ALUout bus may provide the resultant vector to external devices and/or systems. The input ALUout may connect to MUX 210 and/or MUX 230 to permit successive operations. The 32-bit ALUout output may be replicated 4 times to 128 bits for 128-bit functional inputs. The ALUcarry flag may indicate a carry-out for arithmetic operations, or may indicate multiple matches for matching operations. The ALUzero flag may indicate that the last resultant was all zeros for an arithmetic operation, or may indicate that no matches occurred during the last matching operation. The ALUsign flag may provide the high order bit of the ALUout bus (i.e., ALUout<31>). The ALUout<3 . . . 0> flag may provide the four low order bits of the ALUout bus (i.e., ALUout<3,2,1,0>).

In FIG. 2, the MUX 210, MUX 220, MUX 230, and MUX 240 are shown integrated into the ALU 140. It will be appreciated that the techniques described herein are equally applicable to an ALU 140 connected to external multiplexers or any other multiplexer design implementation that allows for the selection of 32-bits out of the 8 (128-bit) input buses. The MUX 210 may include an 8-input multiplexer to select the 128-bit operand source from various input sources for INPUT A, denoted Ax, Bx, Cx, Dx, ALUout, Ex, Fx, or Gx. The MUX 220 may include a 4-to-1 multiplexer to select 32-bits out of the 128-bit input. The output of MUX 220 may become the input to the INPUT A bus of the ALU 140.

The MUX 230 may include an 8-input multiplexer to select the 128-bit operand source from various input sources for INPUT B, denoted Ay, By, Cy, Dy, ALUout, Ey, Fy, or Gy. The MUX 240 may include a 4-to-1 multiplexer to select 32-bits out of the 128-bit input. The output of MUX 240 may become the input to the INPUT B bus of the ALU 140.

Figure 3:
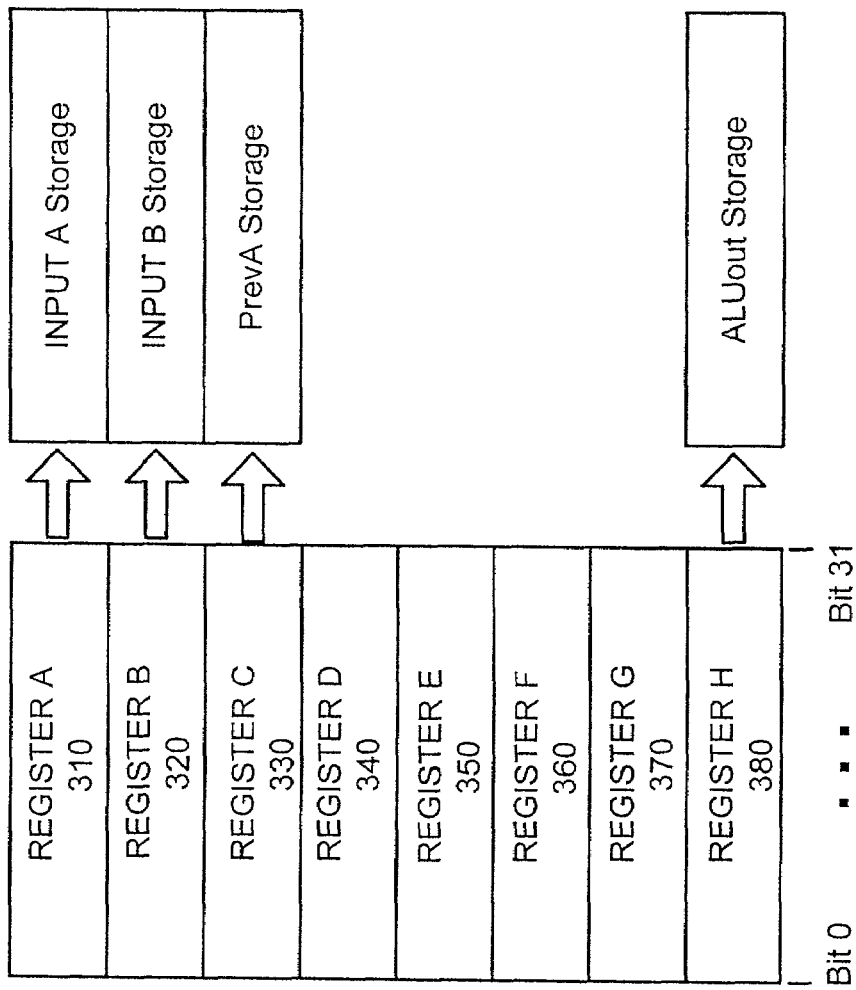
FIG. 3 illustrates an exemplary configuration, consistent with the present invention, of the ALU register unit of FIG. 2.

The ALU register unit 250 may include general-purpose, fast, temporary storage registers that hold operands, status information, and resultants for the ALU 140. FIG. 3 illustrates an exemplary ALU register unit 250 consistent with the present invention. The ALU register unit 250 may include register A 310, register B 320, register C 330, register D 340, register E 350, register F 360, register G 370, and register H 380. Each of the eight registers, register A 310 through register H 380, may consist of a general-purpose 32-bit register.

The ALU 140 may require the use of specific registers for various storage and transmission purposes, or may dynamically locate operands and resultants in register locations. For example, the ALU 140 may designate register A 310 as the storage location for data received from the INPUT A bus, and register B 320 as the storage location for data received from the INPUT B bus. The register C 330 may be used, for example, to store data previously input on INPUT A. This data may be used in a subsequent cycle for pattern matching operations that span 32-bit boundaries. Furthermore, the ALU 140 may designate register H 380 as the ALUout storage register in which the resultant operand is stored prior to transmission on the ALUout bus. It will be appreciated that the ALU register unit 250 may contain more or fewer individual registers than are shown in FIG. 3, and each register may be structured with more or less than 32-bits of storage.

The ternary CAM unit 260 may include any type of ternary content addressable memory that can store three states of information in each cell, such as a logic one state, a logic zero state, and a don't-care state for compare operations. The ternary CAM unit 260 may include an array of cells arranged in rows and columns that can be instructed to compare a specific operand with each of the entries in the array. The entire array, or segments thereof, may be searched in parallel. When performing a search, a CAM entry is considered to match if all the cells in the entry indicate a match, and otherwise fails to match, whenever one or more cells in the entry fails to match the corresponding input bit.

Each cell may represent one-bit of information, and the ternary CAM unit 260 may mask the bit within any individual CAM cell such that a successful match is always produced. The ternary CAM unit 260 may contain a priority encoder to help sort out which matching location has top priority if more than one match exists.

Figure 4:
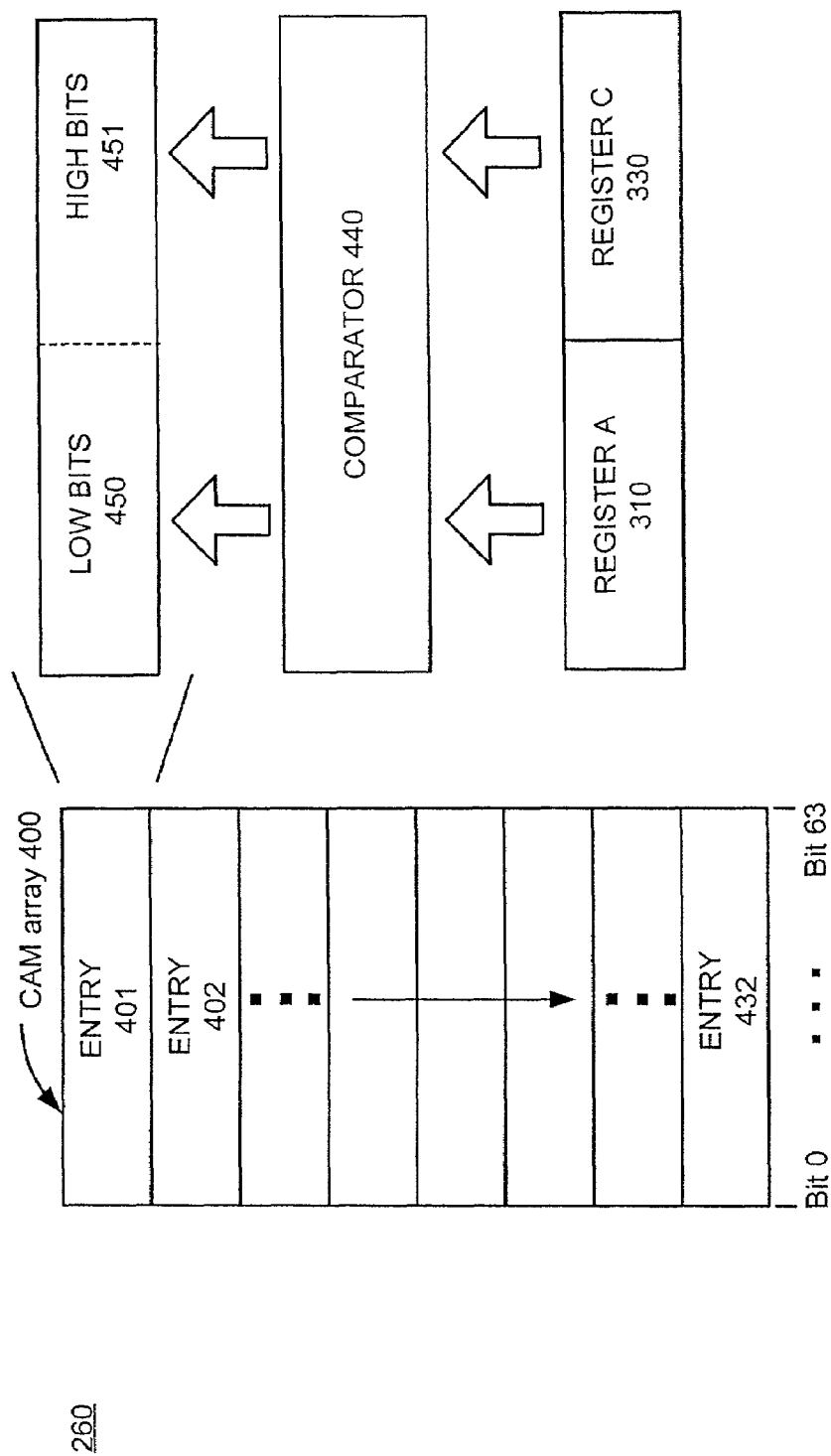
FIG. 4 illustrates an exemplary configuration, consistent with the present invention, of the ternary CAM unit of FIG. 2.

FIG. 4 illustrates an exemplary ternary CAM unit 260 consistent with the present invention. The ternary CAM unit 260 may include a CAM array 400 and comparator 440. The CAM array 400 may include 32 entries, labeled 401 through 432. Each entry 401 through 432 may consist of 64 cells, which together may represent 64 bits of information for each entry. In a 64-bit comparison operation, the higher 32 bits of each 64-bit entry in the CAM array 400 (i.e., high bits 451) may, for example, be compared to the 32-bit PrevA operand, which may be located in register C 330 (FIG. 3). The lower 32 bits of each 64-bit entry in the CAM array 400 (i.e., low bits 450) may be compared to the current INPUT A operand, which may be located in register A 310 (FIG. 3). The comparator 440 may compare an operand with every entry in the CAM array 400 in one clock cycle.

In a packet processing operation, the operand may consist of packet header information. For example, the ternary CAM unit 260 may be used to perform Martian address filtering, as described in "Requirements for IP Version 4 Routers," Request for Comments 1812, June 1995.

Returning to FIG. 2, the operations unit 270 may include the circuitry necessary for performing arithmetic and logical operations in a well-known manner. The operations unit 270 may include, for example, an adder, a shifter, and logic operator circuits. The arithmetic operation to be performed may be received through the ALUfunc input. The logical operation to be performed may be received via the ALUfunc input.

Exemplary Process for Performing Matching Operations

Figure 5:
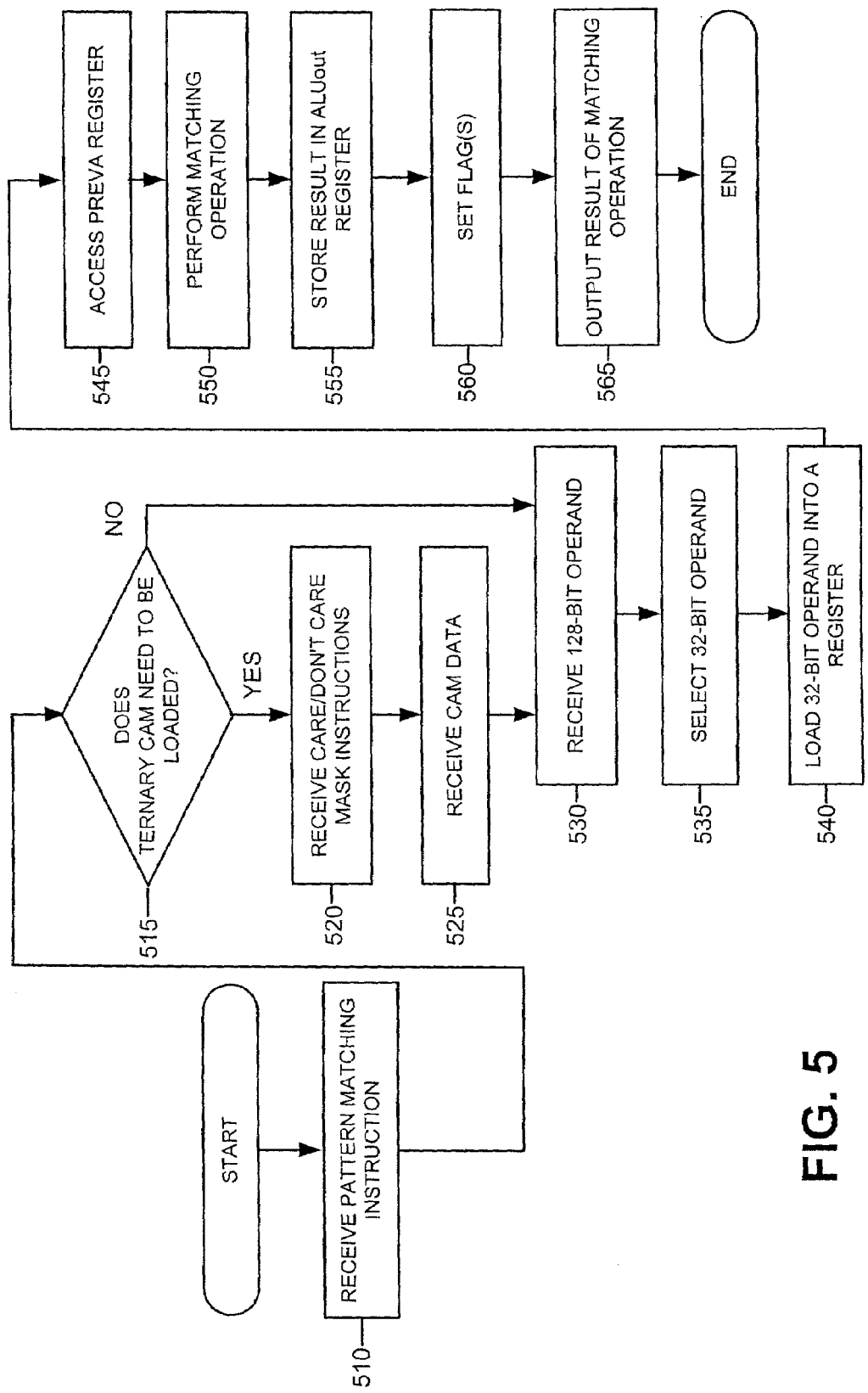
FIG. 5 illustrates exemplary processing, consistent with the present invention, for performing pattern-matching operations.

FIG. 5 illustrates exemplary processing, consistent with the present invention, for performing a pattern matching operation, such as an address lookup operation. Processing may begin with the control unit 130 receiving an instruction that indicates that a pattern matching operation is to be performed on one or more operands [act 510]. The control unit 130 may provide the command to the ALU 140 via the ALUfunc bus.

The ALU 140 may be instructed to perform one of the following operations: Match(PrevA, A) or MatchAddr (PrevA, A). The Match(PrevA, A) instruction may cause the ALU 140 to compare the contents of the PrevA register (e.g., register C 330 from FIG. 3) and the contents of the INPUT A register (e.g., register A 310 from FIG. 3) with each of the entries in the ternary CAM unit 260, and then output a 32-bit matching vector. The MatchAddr(PrevA, A) instruction may cause the ALU 140 to perform the same matching function as described for the Match(PrevA, A) instruction, however, the output in this case may be the highest address location from the ternary CAM unit 260 (i.e., entry 401 through entry 432 in FIG. 4.) at which the matching operation was successful. When multiple matches occur, one match from the multiple matches will be selected according to predetermined priority criteria.

A determination is made as to whether the ternary CAM unit 260 needs to be loaded [act 515]. If the ternary CAM unit 260 is already loaded with data for comparison, then the processing may continue on to act 530. If the ternary CAM unit 260 needs to be loaded, then the ternary CAM unit 260 may receive care/don't care mask instructions [act 520]. The mask instruction, designated by LoadCAMMask(PrevA, A), may be received by the ALU 140 on the ALUfunc bus. The mask instruction may cause a mask of the comparison result of any specific bit in the operand. The ternary CAM unit 260 may mask any 1-bit cell within any 64-bit entry (i.e., entry 410 through entry 432 from FIG. 4).

Following the receipt of the masking instructions, the ternary CAM unit 260 may then receive the data to fill at least one of the 64-bit entries of the CAM array 400 [act 525]. The load instruction, designated by LoadCAM[B](PrevA, A), may be received by the ALU 140 on the ALUfunc input. The ALU 140 may then load the PrevA register with 32 bits of data from the INPUT A bus (e.g., register C 330 from FIG. 3), load the INPUT A register (e.g., register A 310 from FIG. 3) with the next 32 bits of data from the INPUT A bus, and load the INPUT B register (e.g., register B 320 from FIG. 3) with an index value from the INPUT B bus. The combined 64-bit data, whose high bits are composed of the PrevA register and whose low bits are composed of the INPUT A register, may now be loaded into the CAM array 400, at the address indexed by the contents of the INPUT B register. The process of (1) acquiring the PrevA data, (2) acquiring the INPUT A data, (3) acquiring the INPUT B index value, and (4) storing the combined 64-bit data in the CAM array 400 at a location indexed by B may continue until all the necessary data have been received by the ALU 140.

An alternate fast-load method may be used to load the ternary CAM unit 260. The ALU 140 may receive a CAM-FastLoad(A, B) command via the ALUfunc bus that causes the ternary CAM unit 260 to sequentially load each entry (i.e., entry 410 through entry 432 from FIG. 4) from a succession of mask/value pairs received on the INPUT A and the INPUT B buses, respectively.

The ALU 140 may then receive a 128-bit operand [act 530]. The operand may be selected by the ALU 140 through the receipt of a command on the ALUselA input. The ALUselA input may cause one of the eight input buses (i.e., Ax, Bx, Cx, Dx, ALUout, Ex, Fx, or Gx) to be chosen to pass through the MUX 210 (FIG. 2). The ALU 140 may select 32 bits out of the 128 bits to be output by the MUX 210 through the receipt of a command on the ALUlaneA input [act 535]. The 32-bit operand may then be provided to ALU register unit 250 on the INPUT A bus.

The selected 32-bit operand may then be loaded into a storage register [act 540]. The ALU register unit 250 may receive the 32-bit operand from the INPUT A bus and store it, in register A 310, for example, for further processing. The ALU 140 may then access the contents previously stored in the PrevA register in preparation for the matching operation to follow [act 545]. The 32 bits of INPUT A data, stored in register A 310 for example, and the 32 bits of PrevA data, stored in register C 330 for example, may now be ready to be compared to each of the 64-bit entries in the ternary CAM unit 260.

The ternary CAM unit 260 may then perform the matching or comparison operation [act 550]. The ternary CAM unit 260 may compare each 64-bit register entry (i.e., entry 401 through entry 432) against the INPUT A word stored in register A 310 and the PrevA word stored in register C 330 (see FIG. 4). The high 32 bits of each 64-bit entry of the CAM array 400 may be compared against the PrevA word, and the low 32 bits may be compared against the INPUT A word (FIG. 4). The comparison taking place in those cells of each entry whose comparison results were masked in act 520, may always result in a match.

The result of the matching operation may then be stored in the ALUout register [act 555]. The ALU 140 may designate the register H 380 as the location at which the ALUout resultant is always stored, or may store the resultant in any other general register location. The resultant stored in the ALUout register may depend upon the type of matching operation received in act 505. For the basic matching operation designated by Match(PrevA, A), the resultant may consist of the 32-bit matching vector. This matching operation is useful for looking for packet framing and bit/byte-stuff and unstuff patterns. For the basic matching operation designated by MatchAddr(PrevA, A), the resultant may consist of the highest entry address location (i.e., entry 401 through entry 432 from FIG. 4) in the ternary CAM unit 260 at which a match was found. This operation is useful for packet classification and packet bit or byte framing alignment.

The ALU 140 may then set the output flags based upon the results of the matching operation [act 560]. The ALUcarry output flag may be set if multiple matches were found in the ternary CAM unit 260. The ALUzero flag may be set if no match occurred during the matching operation. If used with the matching operation, the ALUsign flag may provide the contents of the high order bit (i.e., bit 31) of the resultant ALUout register, and the ALUout<3 . . . 0> flag may provide the low 4 bits (i.e., bits 3, 2, 1, and 0) of ALUout register.

The resultant stored in the ALUout register (e.g., register H 380) may be provided as an output of the ALU 140 via the ALUout bus [act 565]. The resulting 32-bit word may be replicated four times to 128 bits, if necessary.

The aforementioned acts in FIG. 5 describes one implementation, consistent with the present invention, in which processing speed may be increased through the use of a CPU with a unique hardware design. Implementations consistent with the present invention offer a unique approach to ALU design with the integration of a ternary CAM unit. This unique design, when implemented in a network device (e.g., a router), may improve such network operations as the section bytes/bits to insert or delete for "stuff/unstuff" operations, address lookup operations, and packet classification.

CONCLUSION

Systems and methods, consistent with the present invention, provide mechanisms through which faster processing of data packets is made possible through the use of a CPU specialized for this function. A unique CPU design incorporates a specialized ALU that contains a ternary CAM to increase processing performance. The ternary CAM may contain multiple entries each consisting of multiple cells, and may compare an operand with all of its entries in one clock cycle. The ternary CAM may have the ability to mask the comparison of any cell within any entry.

The foregoing description of exemplary embodiments of the present invention provides illustration and description, but is not intended to be exhaustive or to limit the invention to the precise form disclosed. Modifications and variations are possible in light of the above teachings or may be acquired from the practice of the invention. For example, while the above-described CPU contains a single ALU and associated ternary CAM unit, it will be appreciated that the present invention is equally applicable to a CPU containing multiple ALUs and/or ternary CAM units. In such an implementation, the CPU may be capable of performing multiple operations in parallel to further increase performance.

While a series of acts has been described with regard to FIG. 5, the order of the acts may be varied in other implementations consistent with the present invention. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. In a network device, a central processing unit (CPU) comprising:
   an arithmetic logic unit; and
   a ternary content addressable memory operatively coupled to the arithmetic logic unit within the CPU and configured to perform one or more matching operations.

2. The CPU of claim 1 wherein the one or more matching operations includes a network packet processing operation.

3. The CPU of claim 2 wherein the packet processing operation includes an address lookup operation.

4. The CPU of claim 3 wherein the address lookup operation includes an Internet Protocol (IP) address lookup operation.

5. The CPU of claim 1 wherein the one or more matching operations includes a packet stuff/unstuff operation.

6. The CPU of claim 1 wherein the one or more matching operations includes a packet classification operation.

7. The CPU of claim 1 wherein the ternary content addressable memory is located within the arithmetic logic unit.

8. The CPU of claim 1 further comprising:
   a first register configured to store a first 32-bit operand; and
   a second register configured to store a second 32-bit operand.

9. The CPU of claim 8 wherein the ternary content addressable memory performs the one or more matching operations based on at least one of the first or second 32-bit operands.

10. The CPU of claim 8 wherein the ternary content addressable memory includes a memory array including a group of 64-bit entries, and
    wherein, when performing the one or more matching operations, the ternary content addressable memory compares higher order bits of each entry of the memory array to the first 32-bit operand and compares lower order bits of each entry of the memory array to the second 32-bit operand.

11. The CPU of claim 1 wherein the ternary content addressable memory includes a memory array that includes a group of 64-bit entries.

12. The CPU of claim 11 wherein the memory array comprises 32 entries.

13. The CPU of claim 1 wherein, when performing the one or more matching operations, the ternary content addressable memory is configured to:
    compare an operand to a group of entries.

14. The CPU of claim 13 wherein the ternary content addressable memory is further configured to:
    set a first flag when the operand fails to match an entry in the group of entries, and
    set a second flag when the operand matches multiple entries of the group of entries.

15. The CPU of claim 13 wherein, prior to comparing, the ternary content addressable memory is configured to:
  sequentially load the group of entries from a succession of mask/value pairs transferred to the ternary content addressable memory.

16. A system for forwarding packets in a network device, comprising:

means for receiving at least one packet; and
means for processing the packet using a ternary content addressable memory resident within a central processing unit of the network device.

* * * * *